United States Patent
Rossi et al.

(10) Patent No.: US 11,618,194 B2
(45) Date of Patent: *Apr. 4, 2023

(54) APPARATUS FOR INJECTION MOLDING OF PLASTIC MATERIALS

(71) Applicant: INGLASS S.p.A., San Polo di Piave (IT)

(72) Inventors: Massimo Rossi, San Polo di Piave (IT); Massimo De Nadai, San Polo di Piave (IT); Massimo Bisetto, San Polo di Piave (IT)

(73) Assignee: INGLASS S.p.A., San Polo di Piave (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/173,686

(22) Filed: Feb. 11, 2021

(65) Prior Publication Data

US 2021/0170649 A1 Jun. 10, 2021

Related U.S. Application Data

(63) Continuation-in-part of application No. 16/251,134, filed on Jan. 18, 2019, now Pat. No. 10,974,426.

(30) Foreign Application Priority Data

Mar. 13, 2018 (IT) .................. 102018000003490

(51) Int. Cl.
*B29C 45/27* (2006.01)
*B29C 45/28* (2006.01)
(Continued)

(52) U.S. Cl.
CPC ...... *B29C 45/2737* (2013.01); *B29C 33/3828* (2013.01); *B29C 45/281* (2013.01); *B29C 45/7331* (2013.01)

(58) Field of Classification Search
CPC ... B29C 45/281; B29C 45/7331; B29C 45/74; B29C 2045/2753; B29C 45/2737; B29C 33/3828
See application file for complete search history.

(56) References Cited

U.S. PATENT DOCUMENTS 3,707,991 A * 1/1973 Shapiro ................. F16K 11/076
137/625.21
4,682,943 A * 7/1987 Schomblond ....... B29C 45/1635
425/572
(Continued)

FOREIGN PATENT DOCUMENTS

CN 105121121 A 12/2015
CN 206644251 U 11/2017
(Continued)

OTHER PUBLICATIONS

Talian Search Report dated Oct. 23, 2018. 7 pages.
Office Action dated Jan. 12, 2021 in connection with Japanese Patent Application No. 2019-009617 (3 pages).

*Primary Examiner* — Emmanuel S Luk
(74) *Attorney, Agent, or Firm* — RMCK Law Group, PLC (57) ABSTRACT

Apparatus for injection molding of plastic materials comprising a mold including at least one plate, a hot runner distributor of the fluid plastic material, at least one injector and an actuator for controlling the opening and the closing of the injector, supported by the distributor and whose cooling is carried out by means of thermal exchange contact with the plate. Provided for the cooling of the jack actuator provided for is at least one cover made of thermally conductive material at least partly surrounding the actuator in an axially slidable manner and it is maintained in thermal exchange contact with the plate by means of a magnetic or an electro-magnetic force.

20 Claims, 12 Drawing Sheets

(51) Int. Cl.
*B29C 33/38* (2006.01)
*B29C 45/73* (2006.01)

(56) References Cited

U.S. PATENT DOCUMENTS

| | | | | |
|---|---|---|---|---|
| 5,798,122 | A * | 8/1998 | Takahashi | B29C 45/2632 425/193 |
| 6,464,909 | B1 * | 10/2002 | Kazmer | B29C 45/768 425/572 |
| 9,005,509 | B2 * | 4/2015 | Galati | B29C 45/281 264/328.12 |
| 9,205,587 | B2 * | 12/2015 | de Oliveira Antunes | B29C 45/03 |
| 2008/0199559 | A1 * | 8/2008 | Diaconu | B22D 17/007 425/585 |
| 2013/0316039 | A1 * | 11/2013 | Blais | B29C 45/2737 425/549 |
| 2014/0041192 | A1 | 2/2014 | Lee | |
| 2014/0300019 | A1 * | 10/2014 | Moss | B29C 45/2703 425/146 |
| 2014/0353875 | A1 * | 12/2014 | Tan | B29C 45/2806 425/549 |
| 2015/0158227 | A1 * | 6/2015 | Schreyer | B29C 45/7613 425/150 |
| 2015/0306803 | A1 * | 10/2015 | Antunes | B29C 45/77 264/40.5 |
| 2016/0361856 | A1 * | 12/2016 | Tan | B29C 45/281 |
| 2017/0100867 | A1 * | 4/2017 | Tan | B29C 45/72 |
| 2017/0100868 | A1 * | 4/2017 | Tan | B29C 45/2737 |
| 2017/0100869 | A1 * | 4/2017 | Tan | B29C 45/7331 |
| 2018/0056558 | A1 * | 3/2018 | Fukumoto | B29C 45/1756 |
| 2019/0184617 | A1 * | 6/2019 | de Oliveira Antunes | B29C 45/281 |
| 2021/0107190 | A1 * | 4/2021 | Greb | B29C 45/281 |

FOREIGN PATENT DOCUMENTS

JP S61268421 A 11/1986
JP H1097924 A 4/1998

* cited by examiner

APPARATUS FOR INJECTION MOLDING OF PLASTIC MATERIALS

CROSS-REFERENCE TO RELATED APPLICATIONS

This application is a continuation-in-part of U.S. Non-Provisional patent application Ser. No. 16/251,134 filed Jan. 18, 2019, which claims priority to Italian Patent Application No. 102018000003490 filed Mar. 13, 2018. The disclosure of each of the above applications is incorporated herein by reference in its entirety.

FIELD OF THE INVENTION

The present invention refers to apparatus for injection molding of plastic materials of the type comprising a mold having a cavity and including at least one plate, a hot runner distributor of the fluid plastic material, at least one injector for the introduction of the plastic material from the distributor into the mold cavity, and an actuator for controlling the opening and closing of the injector.

More in particular, the invention refers to molding apparatus thus made wherein the actuator which actuates the injector, typically provided with a valve pin axially displaceable between a full closing position and a maximum opening position of the injector, consists in a fluid jack or in an electric motor supported by the distributor.

STATE OF THE PRIOR ART

During the operation of the molding apparatus the actuator, whether pneumatic or hydraulic or electric, is subjected to heating by means of the heat of the distributor, and it is conventionally cooled by means of an autonomous cooling hydraulic circuit. In some applications, even characterised by high temperatures of the mold, there arises the desire that the actuator, particularly in the case of the fluid jack, be without a cooling circuit so as to simplify the molding apparatus further. The heat of the hydraulic jack must however be dissipated, and solutions in which the cooling of the hydraulic jack occurs by means of thermal exchange with the aforementioned at least one mold plate were proposed for this purpose. As concerns this, it should be observed that the expression "mold plate" is used to indicate, in the description and in the claims that follow, the so-called mold clamping plate, as a whole or in relation with a component thereof in that it can consist of several adjacent plates, the die i.e. the fixed part of the mold, a plate of the distributor, as well as the plane of the press of the injection apparatus.

Solutions in which the cooling of the fluid jack occurs by means of the thermal exchange with a metal plate of the apparatus are for example disclosed by documents WO-2009/052611 on behalf of Mold Masters and documents WO-2011/119791 and US-2014041192, U.S. Pat. Nos. 8,349,244, 8,562,336, 8,728,378, EP-2550144, EP-2631059, WO-2015/183332, U.S. Pat. No. 9,682,504, US-2017/0246784, EP-3240666, US-2016/0361856, WO-2016/153608, WO-2016/153632, WO-2016/153703, WO-2016/153704 and WO-2016/153705 on behalf of Synventive Molding Solutions.

Provided in all these prior art solutions is an elastic thrust member, typically consisting of or including a metal spring, interposed between the cylinder of the hydraulic jack and the plate with the aim of guaranteeing the thermal exchange contact irrespective of the thermal dilation phenomena of the hot runner which supports the hydraulic jack directly or indirectly. The use of plastic thrust members is also considered necessary by the prior art so as not to have to demand high precision machining of the mold plate/s against which the cylinder of the actuator must be kept at thermal exchange contact.

The use of such elastic members entails construction complications and thus considerable costs, and the thermal exchange surface between the hydraulic jack and the plate made available by such elastic members is generally limited and thus scarcely efficient.

SUMMARY OF THE INVENTION

The object of the present invention is to overcome the aforementioned drawbacks and provide an apparatus for injection molding of plastic materials of the type defined above that allows to obtain an efficient thermal exchange cooling between the actuator and the mold plate in a more simple, economic and functional manner.

With the aim of attaining subject object, the main and peculiar characteristic of the invention resides in the fact that for the cooling of the actuator provided for is at least one cover made of thermally conductive material that at least partly surrounds the body of the actuator in an axially slidable manner and is kept in thermal exchange contact with the said at least one plate by a magnetic or an electro-magnetic force.

When the actuator consists of a fluid jack, i.e. a hydraulic or a pneumatic jack, such cover has a planar radial wall faced to the cylinder of the fluid jack and defining a flat surface at contact with said at least one plate. Such radial wall may be restrained against the plate by a magnetic or electro-magnetic attractive or repulsive force, by a pressurised fluid or by a pneumatic or hydraulic thrust, or still by an electrical drive force, or the combination thereof.

A radial gap is provided between the cover and the body of the jack, and such a gap may be conveniently maintained permanently: to this effect the body and the cover are made of materials having different coefficients of linear thermal deformation.

Guide means such as axial studs or screws are conveniently provided between the body of the jack and said cover.

The invention applies both to the case where the actuator is directly fixed to the hot runner, and in such case the aforementioned at least one plate may consist in the mold clamping plate or in the hot runner plate, or it can be indirectly fixed to the hot runner, laterally thereto, and in such case the aforementioned at least one plate consists of the die plate or hot runner plate. Alternatively, the aforementioned at least one plate may consist in an element of the press of the molding apparatus.

BRIEF DESCRIPTION OF THE DRAWINGS

The invention will now be described in detail with reference to the attached drawings, provided purely by way of non-limiting example, wherein.

DETAILED DESCRIPTION OF THE INVENTION

An apparatus for injection molding of plastic materials conventionally comprises a press (not illustrated) for sending the fluid plastic material to a distributor or hot runner 1 from which the plastic material is injected into the mold cavity (not illustrated) through one or more injectors. Each injector comprises a displaceable valve pin 2, relatively to a mold gate, between a full closing position and a maximum opening position. The displacement of the valve pin 2, and thus the opening and closing of the injector, occur through an actuator which, in the case of the present invention, consists of a fluid jack indicated in its entirety with 3, pneumatic or hydraulic. Alternatively, the actuator could consist in an electric motor.

Figures 1, 2:
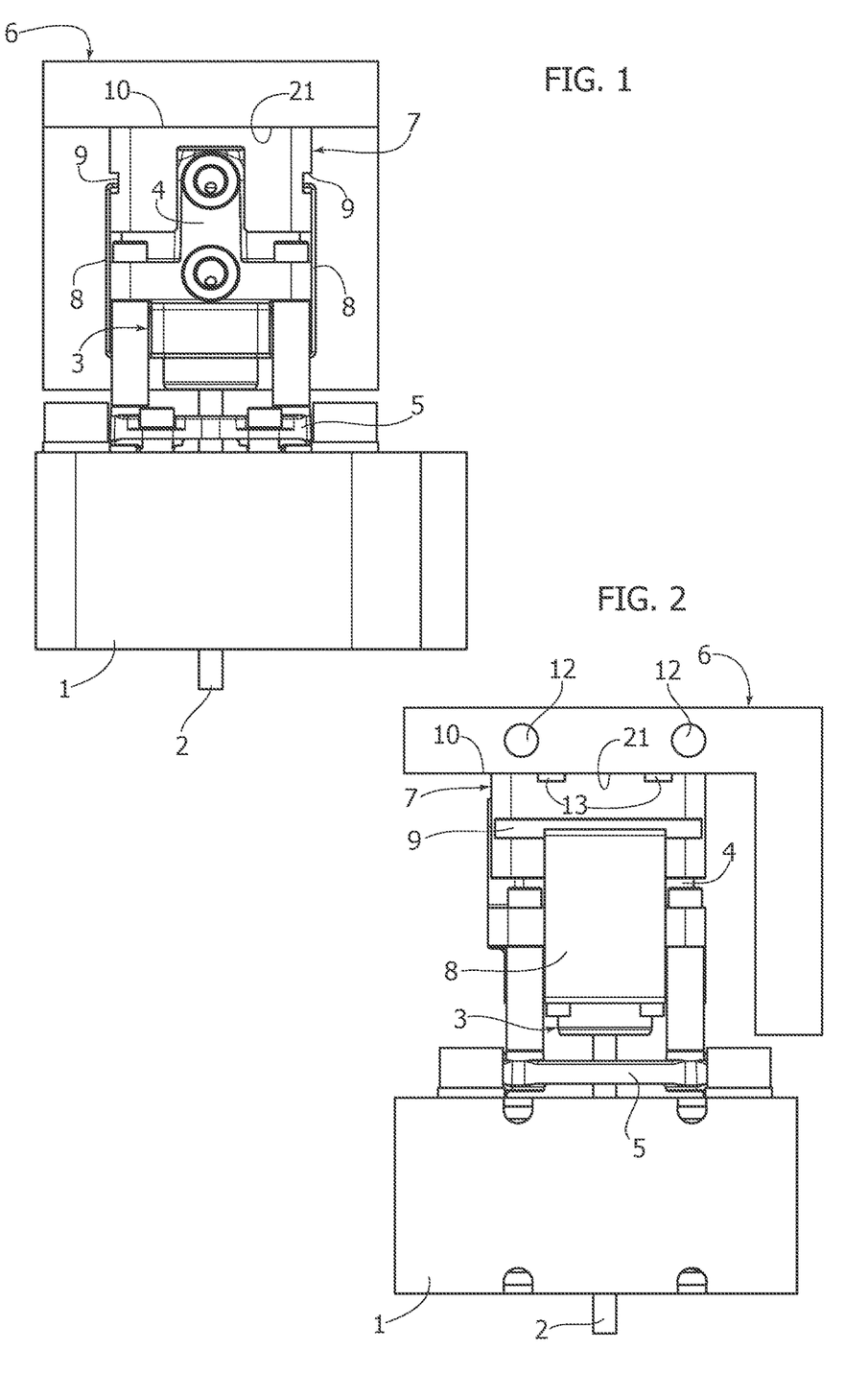
FIG. 1 is a front elevational schematic view of a part of the molding apparatus for injection molding of plastic materials according to the invention.
FIG. 2 is a lateral elevational view of FIG. 1.
Figure 3:
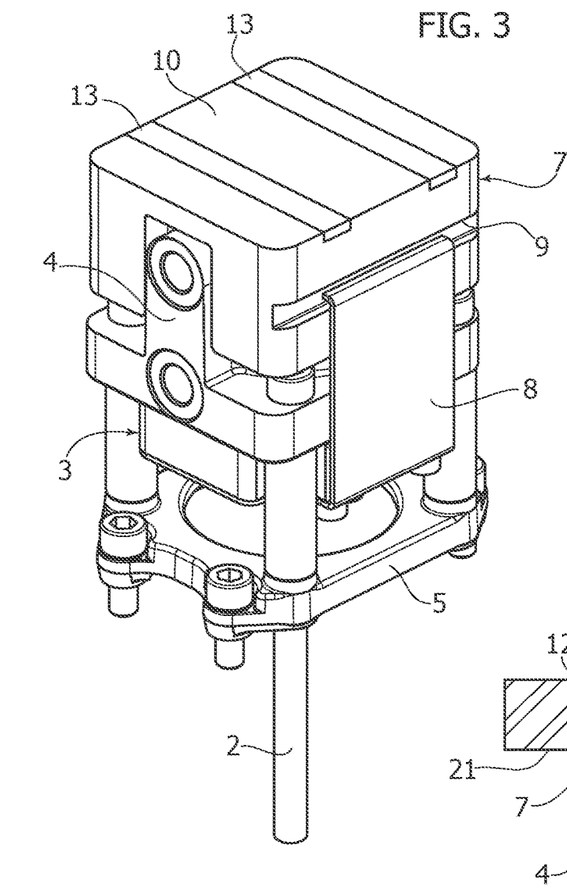
FIG. 3 is a perspective view of FIG. 1.
Figure 4:
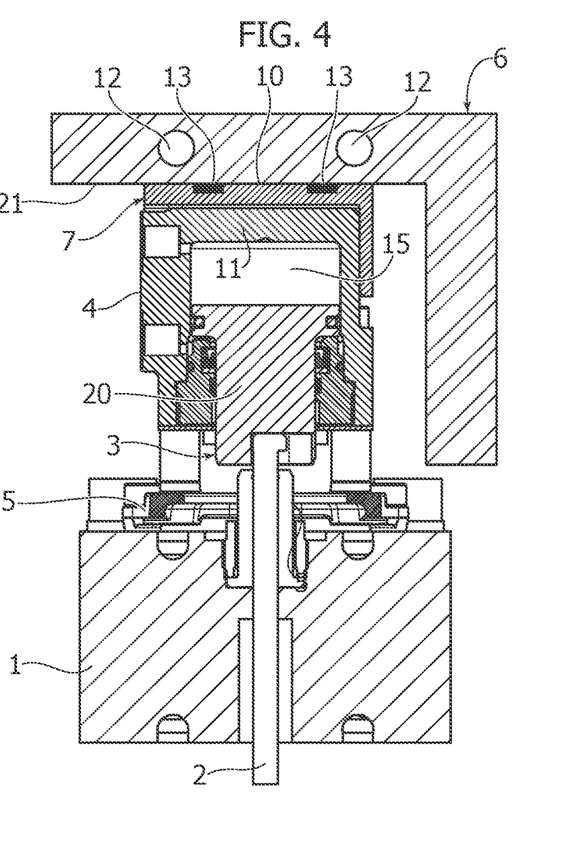
FIG. 4 is a vertical sectional view of FIG. 2.
Figures 5, 6:
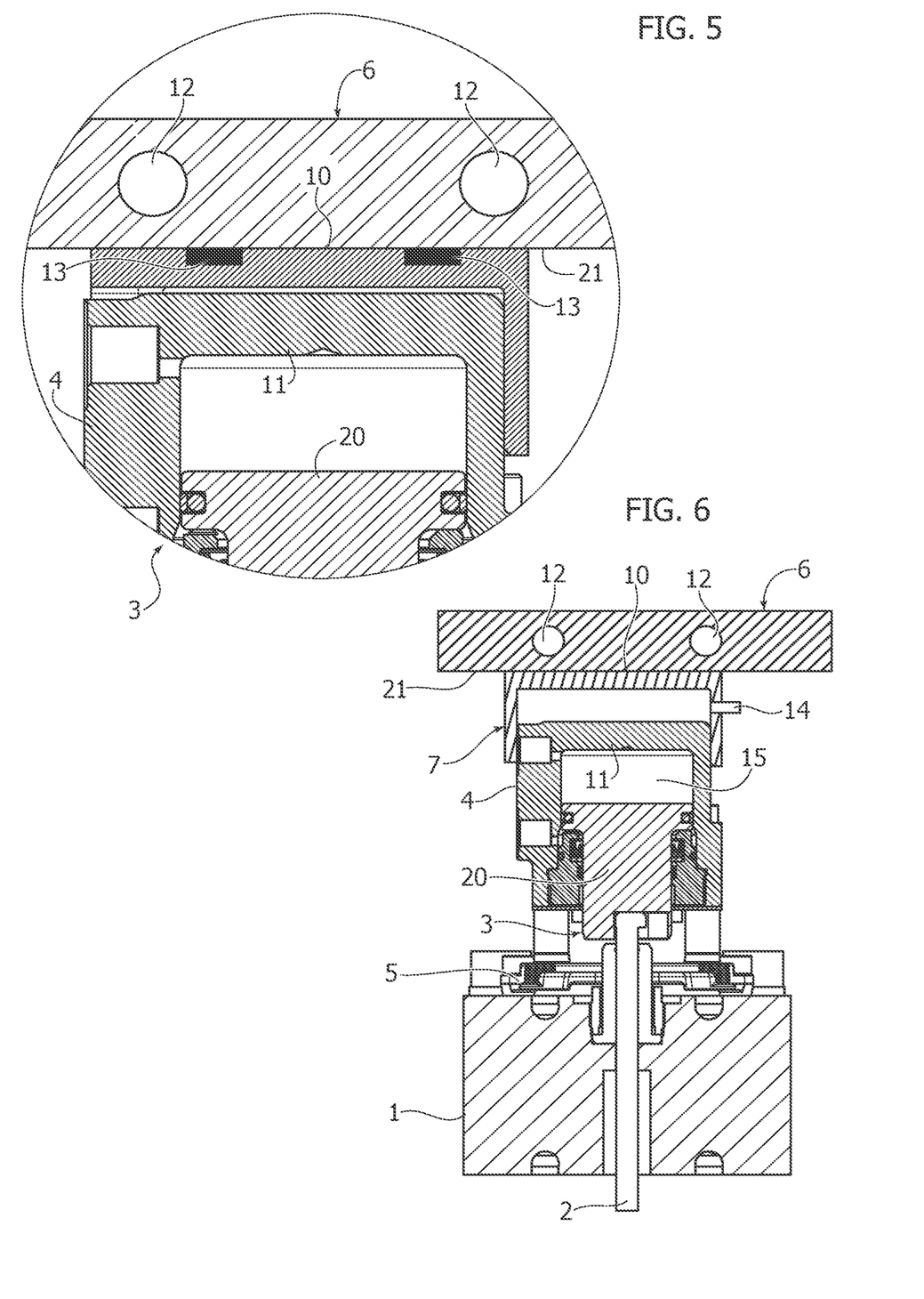
FIG. 5 shows—in an enlarged scale—a detail of FIG. 4.
FIG. 6 shows a first variant of FIG. 4.

In the embodiment which is now being disclosed with reference to FIGS. 1-11 the hydraulic jack 3 comprises a hollow cylinder 4 and a plunger 20 directly or indirectly connected to which is the valve pin 2 for example as shown in FIGS. 4, 6 e 7. The cylinder 4 is at least partly, and preferably almost entirely, surrounded by a cover 7 which shall be further disclosed in better detail.

It is to be pointed out that the term "cylinder" as used herein is intended to designate a body having not only a circular cross section but also any other shape falling within the geometrical definition of that term.

Accordingly, the cylinder 4 could have an elliptical or quadrangular or polygonal cross section, even in order to increase the amount of thermal exchange between the cylinder 4 of the jack 3 and the cover 7 and thus the amount of cooling of the jack 3.

The cylinder 4 of the hydraulic jack 3 is supported by the distributor 1: in the case of the embodiments represented in FIGS. 1 to 8 the cylinder 4 is directly fixed onto the distributor 1, by means of a fixing unit generally indicated with 5. Alternatively, the cylinder 4 of the hydraulic jack 3 may be indirectly fixed to the distributor 1, for instance over or alongside the latter, as observable hereinafter with reference to FIGS. 9 and 10.

The cylinder 4 is without an autonomous cooling circuit that conventionally uses a cooling liquid, and the cooling thereof occurs by means of thermal exchange contact with a plate of the molding apparatus. Such plate may include any mold plate and in particular, like in the case of FIGS. 1 to 8, consists in the clamping plate indicated with 6. Alternatively, this could be a component of such plate or of the hot runner plate (not represented) or of the die (not represented) of the mold in the case where the hydraulic jack is arranged laterally to the hot runner 1, as observable in the case of FIGS. 9 and 10.

It should be observed that the clamping plate 6 or other plates (not shown) can be provided with a liquid cooling circuit, indicated with 12, or it can be without one.

In order to guarantee the thermal exchange contact between the cylinder 4 of the hydraulic jack 3 and the clamping plate 6 the invention provides for, in place of a thrust spring member like in the case of the prior art, the cover 7 which is made of thermally conductive material and at least partly, and preferably for a substantial and almost full perimeter width, surrounds the cylinder 4. This cover 7 is axially slidable relative to the outer surface of the cylinder 4 for a stroke of limited degree by means of one or more C-shaped lateral bands 8 engaged—at one end—with the cylinder 4 and—at the opposite end—an axial clearance in a groove 9 of the cover 7, as better observable in FIG. 8.

A radial gap G is provided between the cylinder 4 and the cover 7.

Preferably the cylinder 4 and the cover 7 are made of materials having different coefficients of linear thermal deformation. Namely, the coefficient of linear thermal deformation of the cylinder 4 is lower than the coefficient of linear thermal deformation of the cover 7: this ensures that the radial gap G may be permanent, i.e. it may be maintained constantly during operation of the apparatus. For instance, the cylinder 4 is conveniently made of cast iron and the cover 7 is made of aluminium.

The minimum amount of the radial gap G can be conveniently in the range of at least 0.01 mm. under cold conditions, i.e. when the apparatus is not operating, and in the range of at least 0.05 mm. under hot conditions, i.e. when the apparatus is operating.

The cover 7 may have a generally L-shaped or C-shaped section with an end radial wall 10 facing the bottom plate 11 of the cylinder 4 and defining a flat surface at planar contact with the clamping plate 6. The lateral wall of the cover 7, indicated with 22, is in sliding thermal exchange contact with the cylinder 4 of the hydraulic jack 3.

The bottom plate 11 may consist in an element separated from the body of the cylinder 4, or it can be made of a single piece with the cylinder 4.

In order to constantly maintain the wall 10 of the cover 7 in thermal exchange contact with the clamping plate 6, the invention provides for different alternative solutions among which the preferred one, represented in FIGS. 2 to 5, applies a magnetic or an electro-magnetic attractive force. To this end, incorporated in the radial wall 10 are permanent magnets facing the clamping plate 6 and cooperating therewith. It should be observed that the arrangement could be inverted, or there could be provided for the incorporation of the magnets 13 in the clamping plate 6.

As observable hereinafter, the magnetic force may also be a repulsive force instead of an attractive force.

Figure 7:
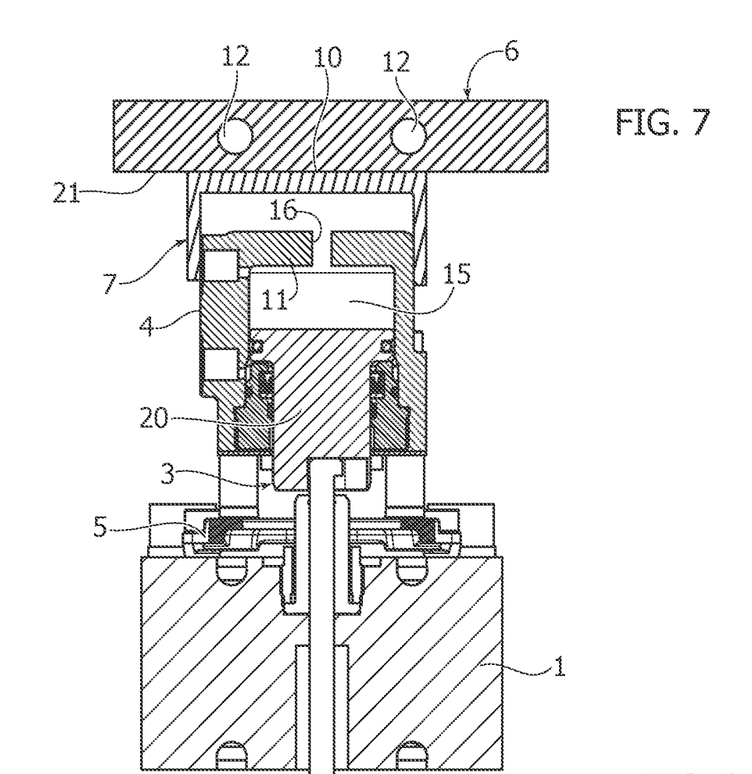
FIG. 7 shows a second variant of FIG. 4.
Figure 8:
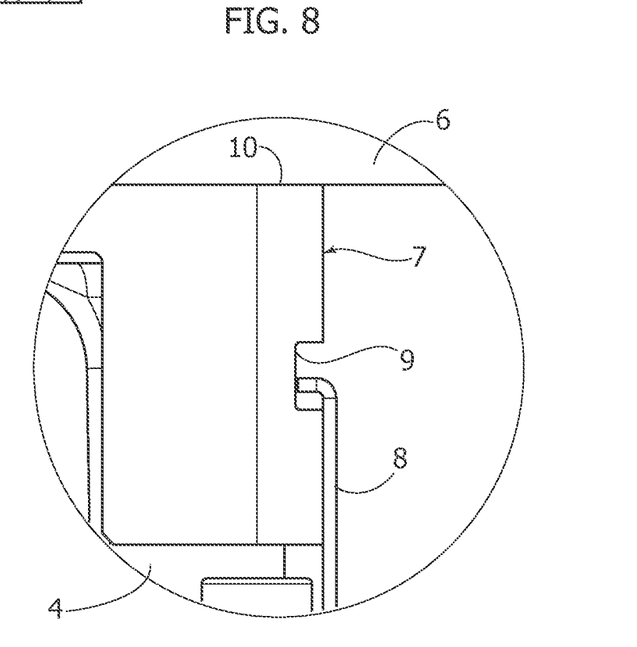
FIG. 8 shows—in an enlarged scale—a detail of FIG. 1.

FIGS. 6 and 7 show two variants in which the thermal exchange contact between the cover 7 and the clamping plate 6 is obtained by means of a pressurised fluid. The solution represented in FIG. 6 provides for a pneumatic thrust which occurs by means of a pressurised gas supplied, through an inlet 14, into a sealed chamber 15 formed between the bottom plate 11 of the cylinder 4 and the wall 10 of the cover 7.

In the case of FIG. 7 the cover 7 is restrained against the clamping plate 6 by a hydraulic thrust conveniently carried out by the hydraulic fluid for actuating the hydraulic jack 3:

to this end, the sealed chamber 15 is placed in communication with the internal of the cylinder 4 through one or more gates 16 formed in the bottom plate 11.

The same arrangement of FIG. 7 can be provided for in the case where the hydraulic jack 3 is actuated pneumatically instead of hydraulically.

According to a further alternative solution not represented in the drawings, the thermal exchange contact between the cover 7 and the clamping plate 6 can be obtained by means of an electrical drive force, or through an electric actuator configured for pushing, by means of a transmission known to a man skilled in the art, the transversal wall 10 against the plate 6.

It should be observed that the various alternatives described above could be combined with each other: so that the pneumatic thrust, the hydraulic thrust and the electrical drive force could be combined with each other and/or with the magnetic attraction.

Figure 9:
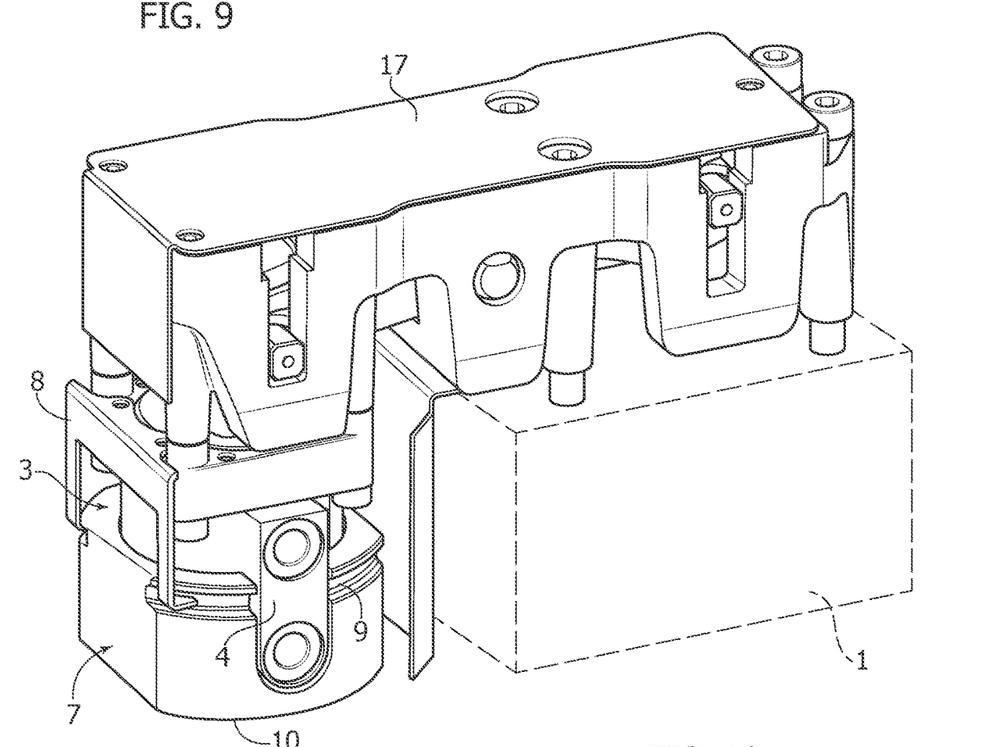
FIG. 9 is a perspective view showing a variant of FIG. 3.
Figure 10:
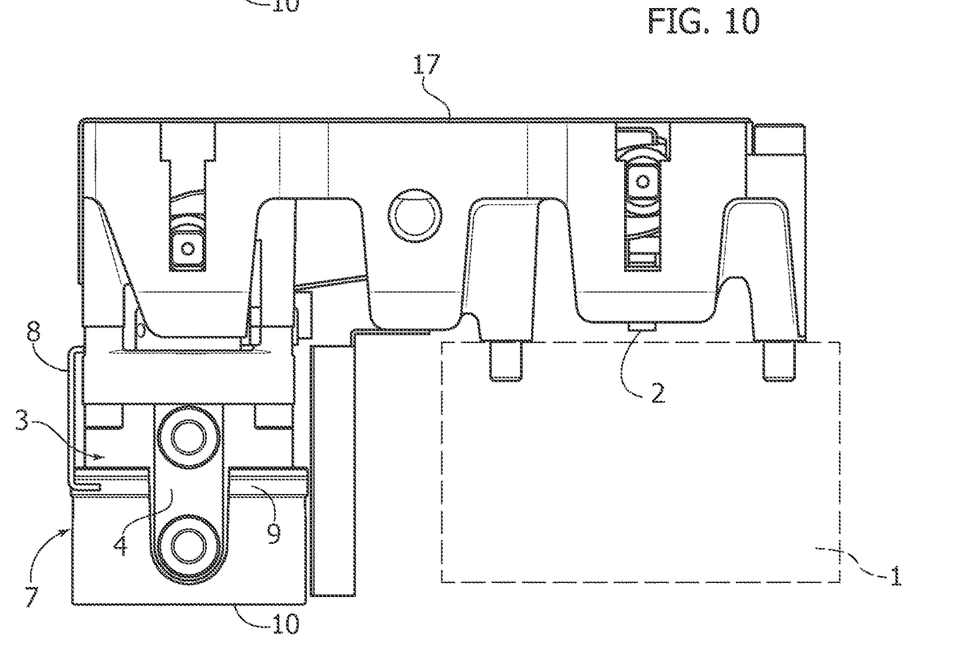
FIG. 10 is an elevational view of FIG. 9.

As previously mentioned, the fluid jack 3 can be fixed, instead of directly onto the hot runner 1, laterally thereto for example as represented in FIGS. 9 and 10. In this case, the hydraulic jack 3 with the body 7 is carried by a support or plate 17 through a mechanical transmission (for instance including a swinging lever or a gear train) for the actuation of the valve pin 2 of the injector (not visible in these figures). The radial wall 10 of the cover 7 is in this case kept at thermal exchange contact, by means of one or more of the previously described alternatives, using a mold plate different from the clamping plate 6 and for example consisting in the die plate or in the hot runner plate or an auxiliary plate, not represented in the drawings since well known to a man skilled in the art.

According to a further alternative not represented in the drawings, the plate against which the cover 7 is in thermal exchange contact can consist in the plane or another element—magnetic or non-magnetic—of the molding apparatus and the relative press to which the mold is associated.

Figure 10A:
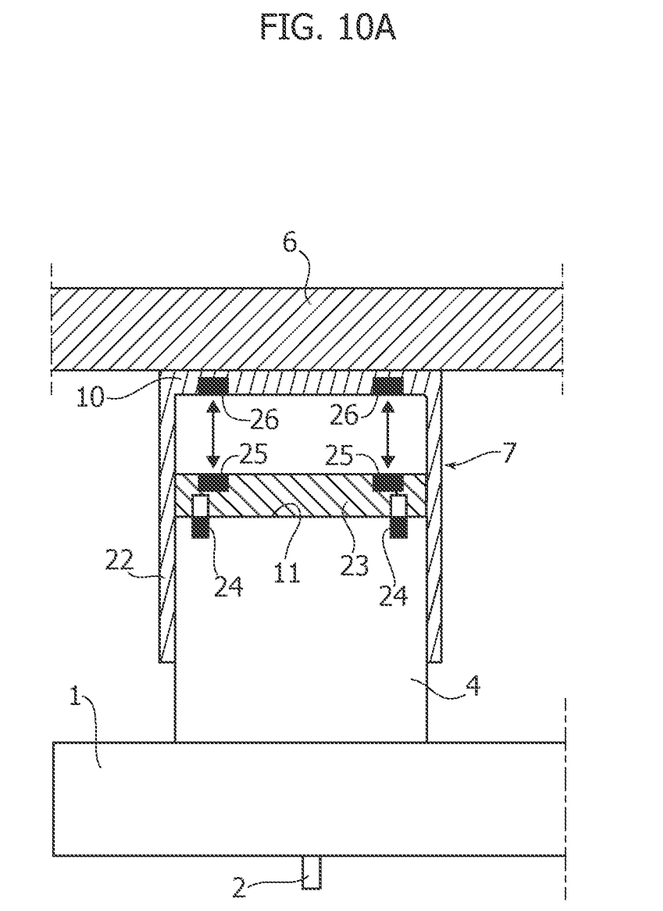
FIG. 10A shows a further variant of FIG. 4.
Figure 11:
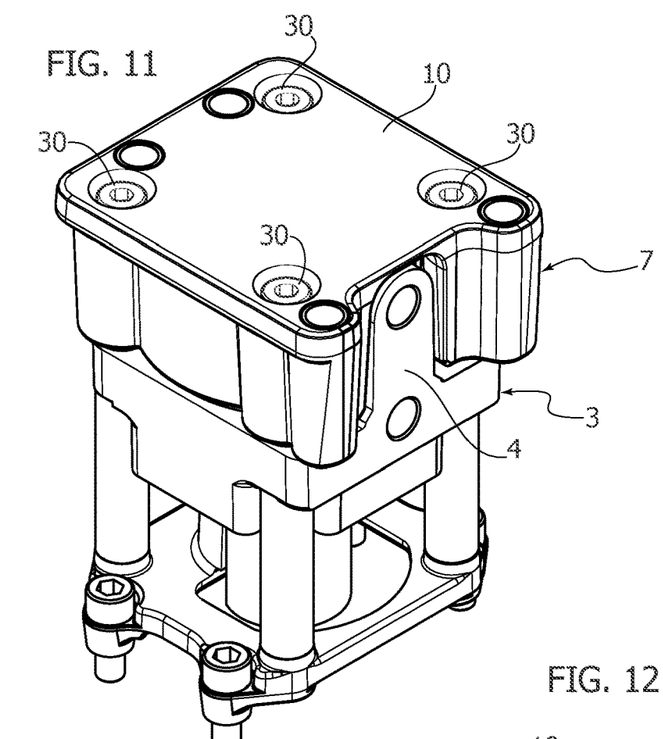
FIG. 11 is a perspective view of a further example of a hydraulic jack and a cover assembly.
Figure 12:
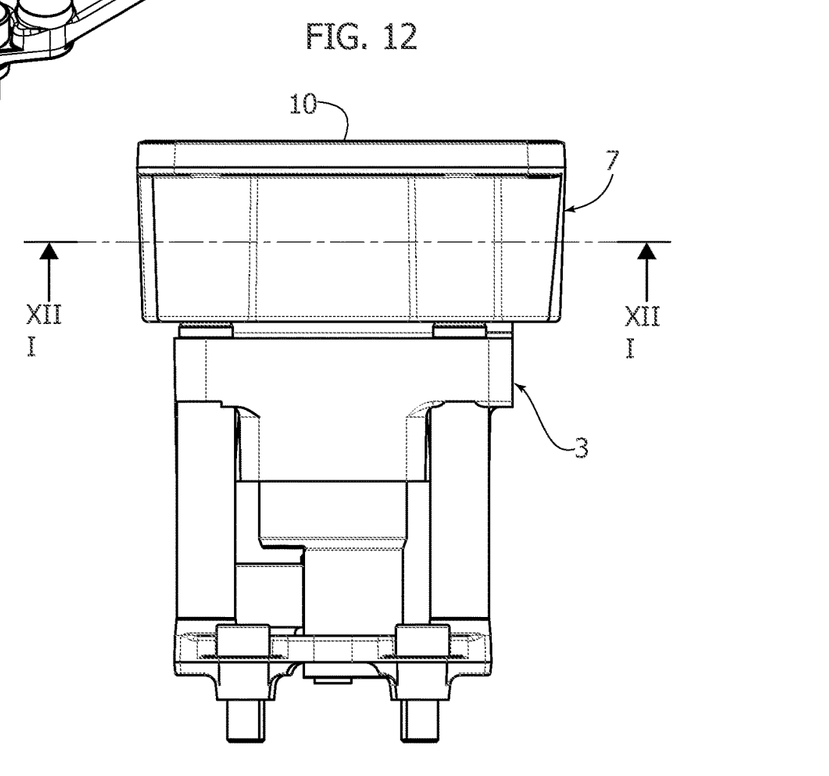
FIG. 12 is an elevational view of FIG. 11.
Figure 13:
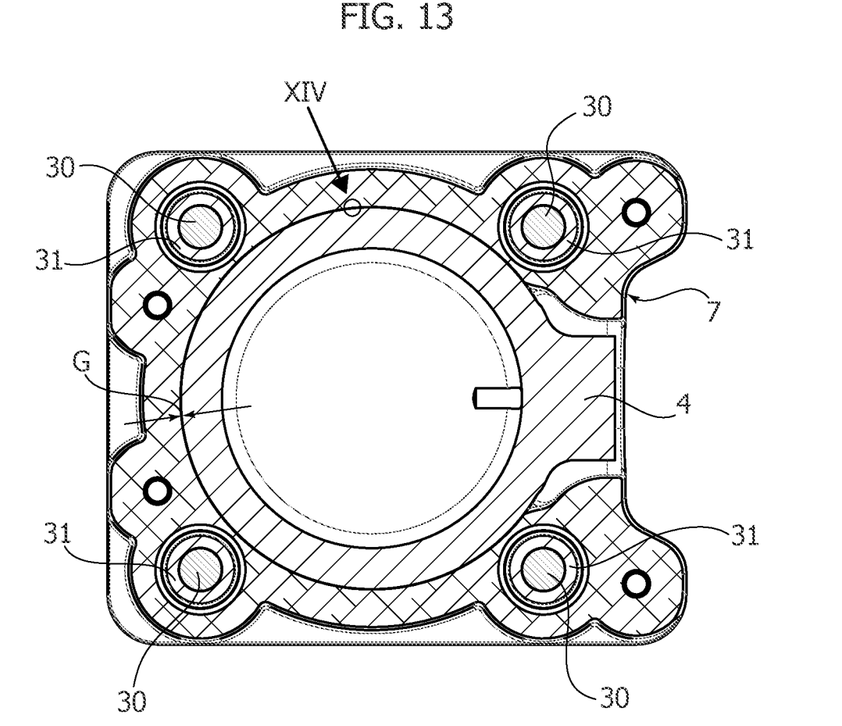
FIG. 13 is a cross section along line XIII-XIII of FIG. 12.

In the further variant of the invention schematically represented in FIG. 10A, besides the cover 7—kept in exchange contact using the cylinder 4 of the hydraulic jack 3 on the one side and using the plate 6 on the other side, provided for is an auxiliary element 23 made of thermally conductive material kept at front thermal exchange contact against the bottom plate of the cylinder 4 and arranged at thermal exchange slidable lateral contact with the lateral wall 22 of the cover 7. Thus, the heat dissipation of the hydraulic jack 3 occurs in an even more efficient manner.

The auxiliary element 23 is kept at constant contact with the bottom plate 11 for example by means of the attraction force obtained by the permanent magnets 24. Furthermore, there can be further provided for permanent magnets 25, 26 respectively carried by the auxiliary element 23 and by the plate 6 and configured so as to obtain a magnetic repulsive force suitable to press the radial wall 10 of the cover 7 against the plate 6.

The magnets 26 can also be directly applied to the bottom plate 11 of the cylinder 4 should the auxiliary element 23 not be present, and the magnetic repulsive force can also be combined with a pressurised fluid thrust and/or with an electrical drive force, as described previously.

It should be observed that the thermal exchange contact between the cover 7 and the plate 6 can be obtained not only by the radial wall 10 but also by the lateral wall 22. This lateral contact can be obtained directly, and in this case the lateral wall 22 will be at least partly inserted into a recess or complementary seat of the plate 6 or of an element of the mold, or indirectly by means of an intermediate element fixed to the plate.

In light of the above it will be clear that the invention is capable of ensuring, during the operation of the molding apparatus, an efficient heat dissipation of the jack 3 in a constructively easy and economic manner.

Additional embodiments of the fluid jack and cover assembly are depicted in FIGS. 11 to 16 in connection with a hydraulic jack, and in FIGS. 17 to 22 in connection with a pneumatic jack.

Figure 14:
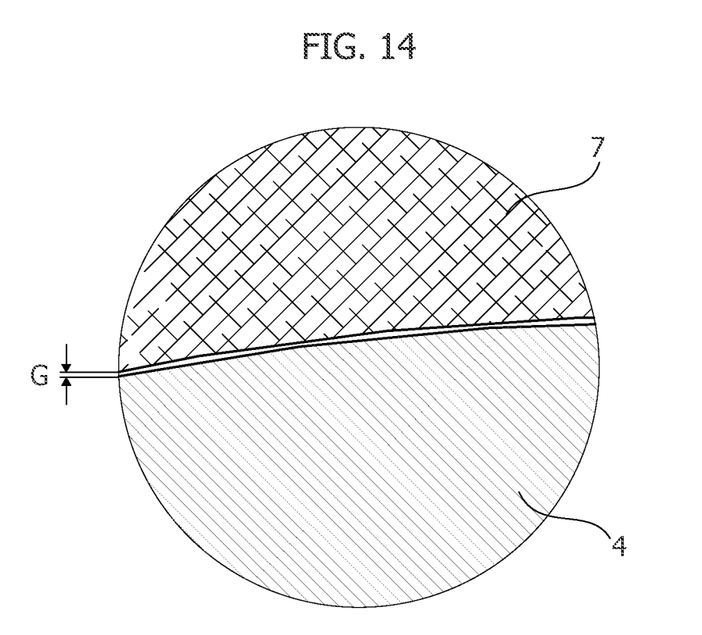
FIG. 14 is an enlarged view of part of FIG. 13.
Figure 15:
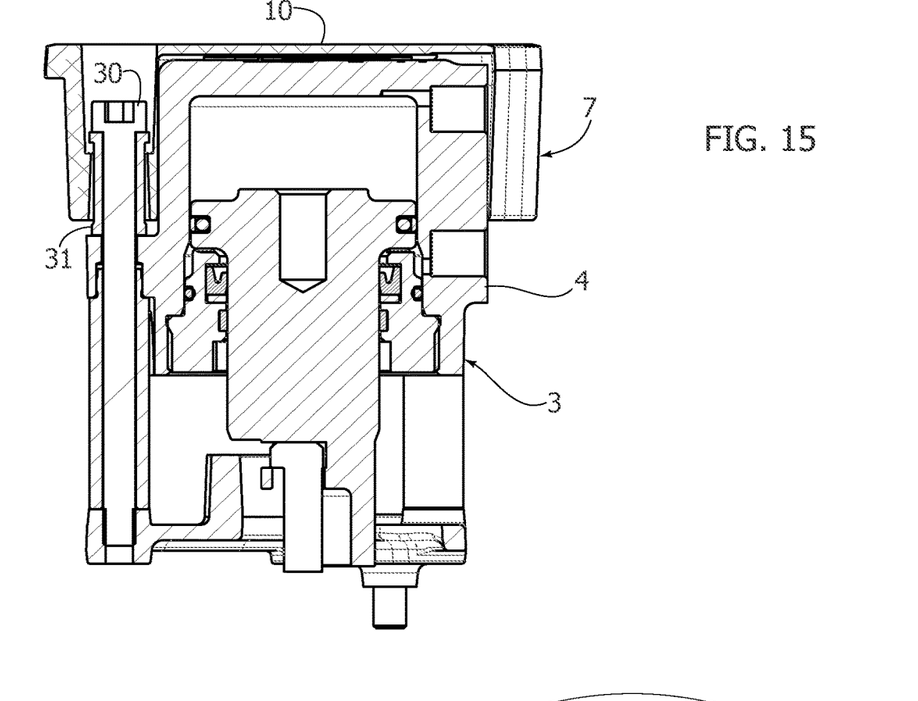
FIG. 15 is an axial section of the assembly.
Figure 16:
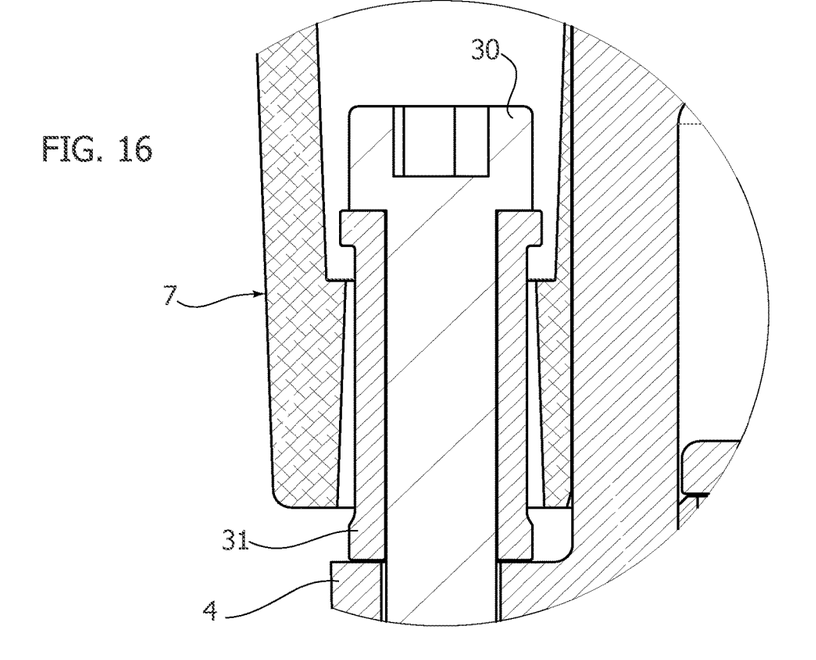
FIG. 16 is an enlarged view of part of FIG. 15.
Figure 17:
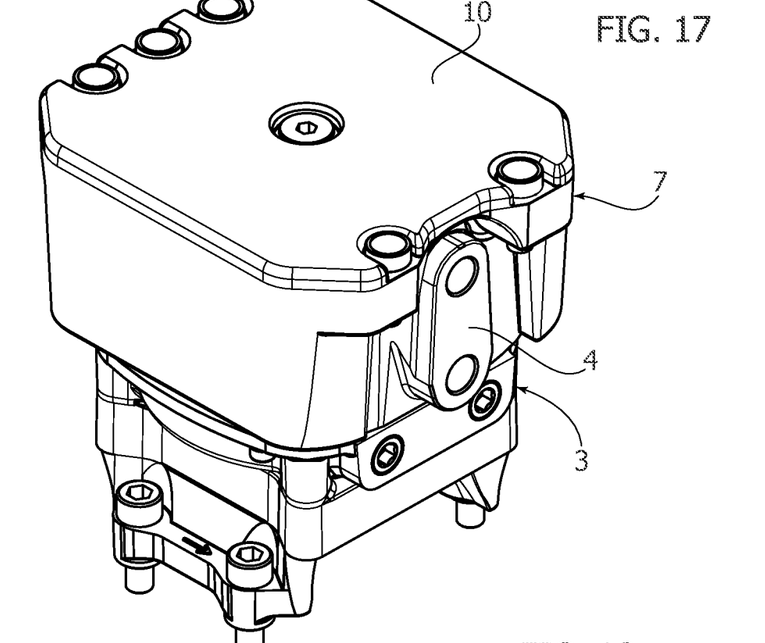
FIG. 17 is a perspective view of a further example of a pneumatic jack and a cover assembly.
Figure 18:
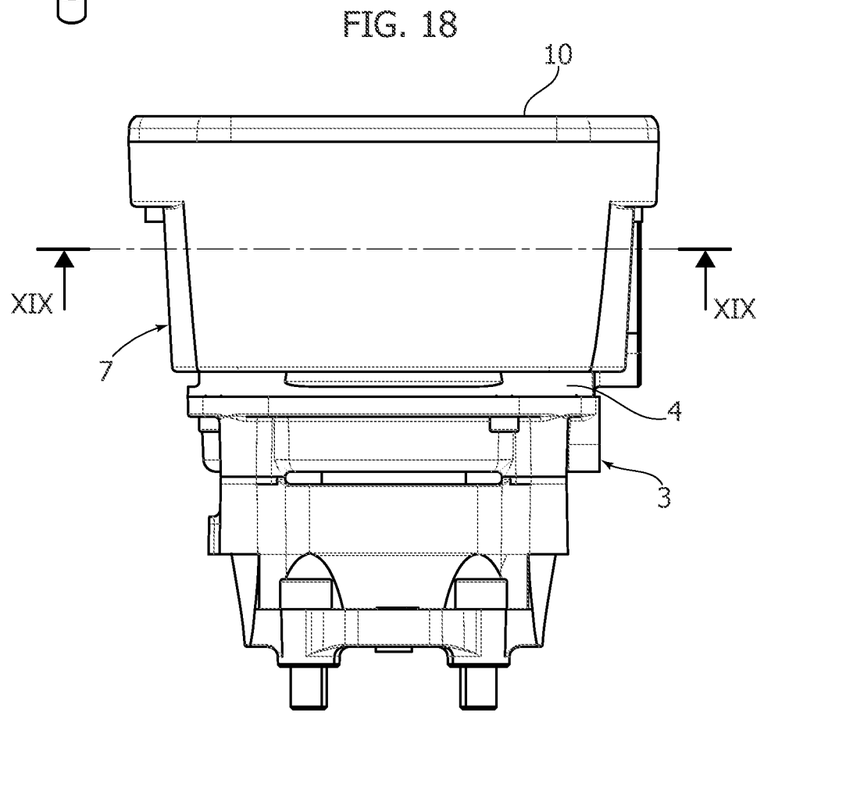
FIG. 18 is an elevational view of FIG. 17.
Figure 19:
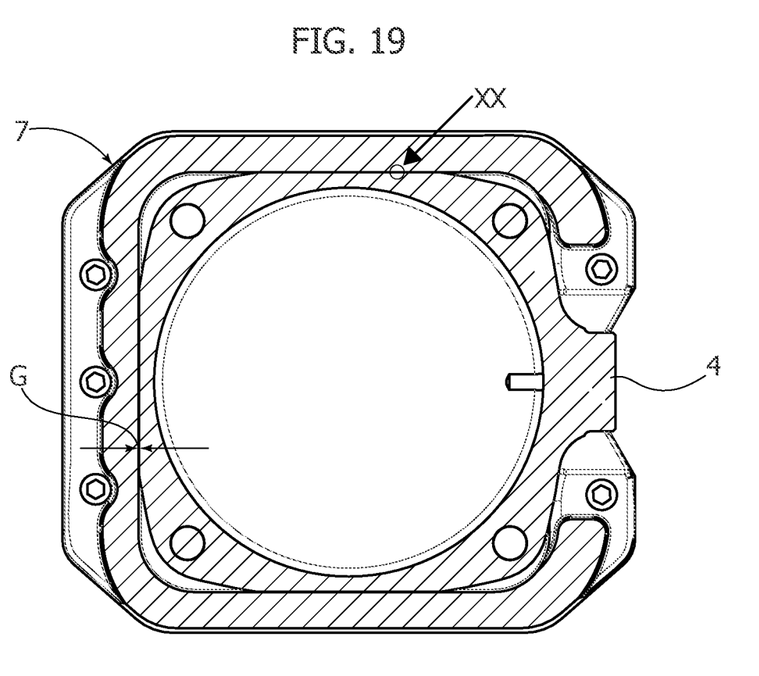
FIG. 19 is a cross section along line XIX-XIX of FIG. 18.
Figure 20:
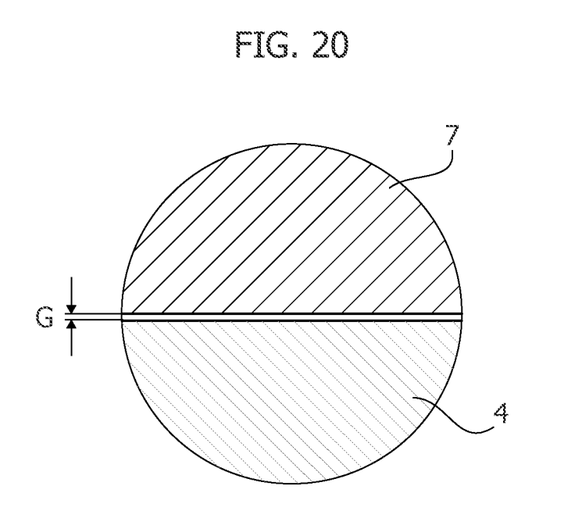
FIG. 20 is an enlarged view of part of FIG. 19.
Figure 21:
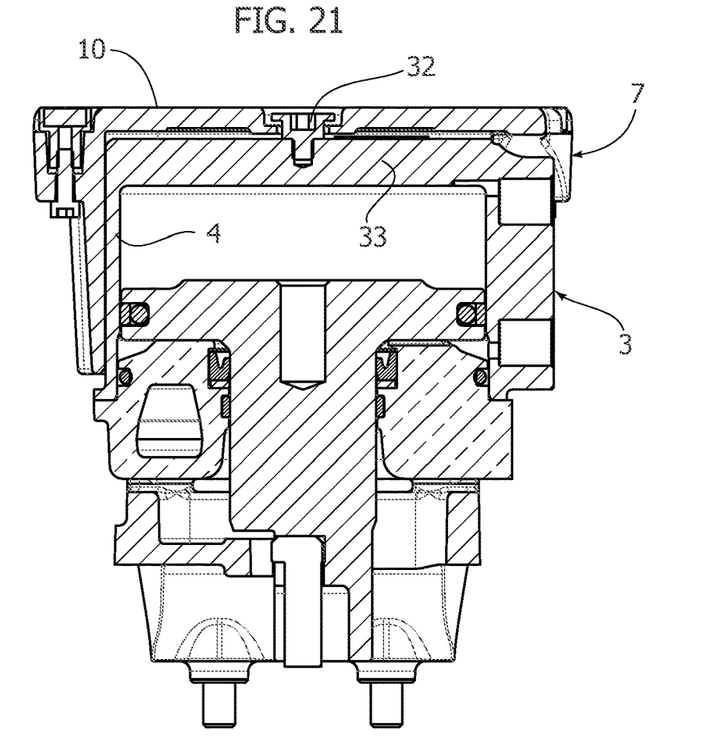
FIG. 21 is an axial section of the assembly.
Figure 22:
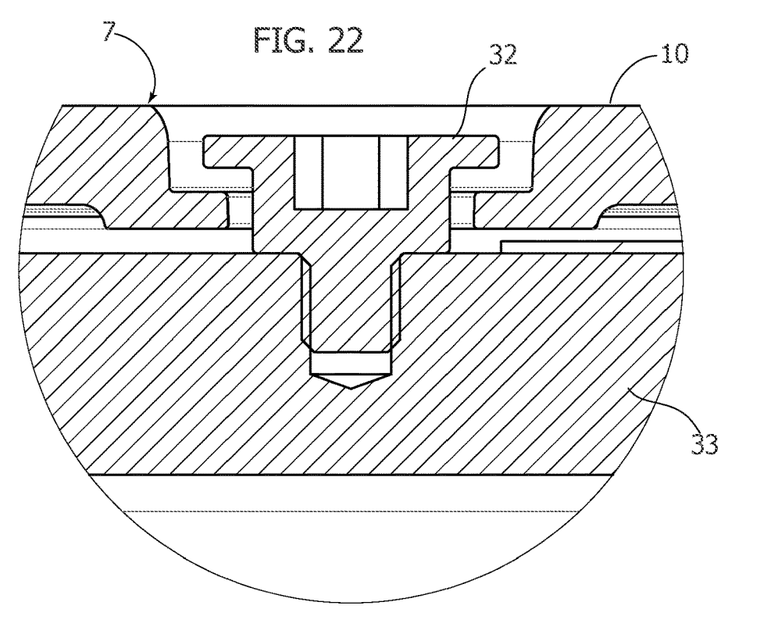
FIG. 22 is an enlarged view of part of FIG. 19.

The radial gap between the cylinder 4 and the cover 7 is better seen and referenced as G in FIGS. 14 and 20, respectively, and the constant presence of such a gap G is also ensured by axial guide means provided between the cylinder 4 and the cover 7. In the example of FIGS. 15 and 16 these guide means comprise four studs 30 fitted within retaining bushes 31 of the hydraulic cylinder 4, while in the example of FIGS. 17, 21 and 22 these guide means comprise a single retaining screw 32 provided centrally between the planar wall 10 of the cover 7 and the top wall 33 of the pneumatic cylinder 4.

Obviously, the construction details and the embodiments may widely vary with respect to what has been described and illustrated, without departing from the scope of protection of the invention as described in the claims that follow. Thus, even if the above description is contemplating the body of the fluid jack and the cover being slidable relative to each other parallelly to the injector, said body and said cover could be instead slidable relative to each other transversely to the injector.

The invention claimed is:

1. An apparatus for injection molding of plastic material comprising a mold, at least one plate, a hot runner distributor of the fluid plastic material, at least one injector for injecting the plastic material from the hot runner distributor into the mold, and an actuator for controlling opening and closing of the at least one injector, the actuator including a fluid jack having a body free from a liquid cooling circuit, wherein the actuator is supported by the hot runner distributor and cooling thereof is performed by means of thermal exchange contact with said at least one plate, wherein for the cooling of the actuator there is provided a cover made of thermally conductive material at least partly surrounding the body of the actuator in a slidable fashion to provide thermal exchange between the body and the cover to cool the actuator, the cover maintained in thermal exchange contact with said at least one plate by a magnetic force, wherein said cover has a planar wall facing said body and defining a surface of contact with said at least one plate, and wherein a radial gap is provided between said cover and said body.

2. The apparatus according to claim 1, wherein said radial gap is provided permanently.

3. The apparatus according to claim 1, wherein said body and said cover are made of materials having different coefficients of linear thermal deformation.

4. The apparatus according to claim 3, wherein a coefficient of linear thermal deformation of said body is lower than a coefficient of linear thermal deformation of said cover.

5. The apparatus according to claim 4, wherein said body is made of cast iron and said cover is made of aluminum.

6. The apparatus according to claim 1, wherein said radial gap is in a minimum range of at least 0.01 mm under cold conditions.

7. The apparatus according to claim 1, wherein said radial gap is in a minimum range of at least 0.05 mm under hot conditions, such as when the apparatus is operating.

8. The apparatus according to claim 1, wherein axial guide members are provided between said body and said cover.

9. The apparatus according to claim 1, wherein said magnetic force is an attractive force.

10. The apparatus according to claim 9, wherein at least one from among said planar wall and said at least one plate incorporates at least one permanent magnet.

11. The apparatus according to claim 1, wherein said magnetic force is an electro-magnetic force.

12. The apparatus according to claim 1, wherein the actuator is directly fixed to the distributor and said at least one plate is a mold clamping plate or a mold plate or a hot runner plate or an auxiliary plate.

13. The apparatus according to claim 1, wherein the actuator is indirectly fixed to the distributor and said at least one plate is a die plate or a hot runner plate or an auxiliary plate.

14. The apparatus according to claim 1, wherein said at least one plate is an element of the injection apparatus.

15. The apparatus according to claim 1, further comprising an auxiliary element made of thermally conductive material kept in front thermal exchange contact against said actuator and arranged in thermal exchange slidable lateral contact with said cover.

16. The apparatus according to claim 15, wherein said auxiliary element is kept at contact with said actuator by a magnetic attractive force.

17. The apparatus according to claim 1, wherein said magnetic force is repulsive force.

18. The apparatus according to claim 1, wherein said body is a hollow cylinder having a cross section selected among a circular, an elliptical, a quadrangular and a polygonal shape.

19. The apparatus according to claim 1, wherein said body and said cover are slidable relative to each other parallel to the at least one injector.

20. The apparatus according to claim 1, wherein said body and said cover are slidable relative to each other transversely to the at least one injector.

\* \* \* \* \*